United States Patent
Vroon

(10) Patent No.: US 9,452,584 B2
(45) Date of Patent: *Sep. 27, 2016

(54) PARTITION ASSEMBLY MADE WITH PARTITIONS HAVING ROUNDED EDGES, STIFFENING MEMBERS AND METHOD OF MAKING SAME

(71) Applicant: Bradford Company, Holland, MI (US)

(72) Inventor: William J. Vroon, Holland, MI (US)

(73) Assignee: Bradford Company, Holland, MI (US)

(*) Notice: Subject to any disclaimer, the term of this patent is extended or adjusted under 35 U.S.C. 154(b) by 494 days.

This patent is subject to a terminal disclaimer.

(21) Appl. No.: 14/030,200

(22) Filed: Sep. 18, 2013

(65) Prior Publication Data
US 2014/0018223 A1    Jan. 16, 2014

Related U.S. Application Data

(63) Continuation of application No. 13/714,677, filed on Dec. 14, 2012, now Pat. No. 8,562,884, and a continuation of application No. 12/575,108, filed on Oct. 7, 2009, now Pat. No. 8,360,306.

(51) Int. Cl.
| | |
|---|---|
| *B31D 5/00* | (2006.01) |
| *B29C 65/00* | (2006.01) |
| *B31B 11/00* | (2006.01) |
| *B65D 25/04* | (2006.01) |
| *B32B 5/18* | (2006.01) |

(52) U.S. Cl.
CPC ............. *B31D 5/0013* (2013.01); *B29C 65/00* (2013.01); *B31B 11/00* (2013.01); *B31D 5/0004* (2013.01); *B65D 25/04* (2013.01); *B32B 5/18* (2013.01)

(58) Field of Classification Search
None
See application file for complete search history.

(56) References Cited

U.S. PATENT DOCUMENTS

| | | | | |
|---|---|---|---|---|
| 2,647,679 | A * | 8/1953 | Schilling | B65D 5/48038 217/30 |
| 2,958,452 | A * | 11/1960 | Kuchenbecker | B65D 5/48034 229/120.25 |
| 3,399,098 | A | 8/1968 | Omoto et al. | |
| 3,487,479 | A * | 1/1970 | Grooms | A47D 7/002 229/120.24 |
| 3,491,909 | A * | 1/1970 | Ikelheimer | A45C 13/02 190/109 |
| 3,647,607 | A | 3/1972 | Hillers | |
| 3,859,161 | A * | 1/1975 | McLeod | B42F 5/00 156/202 |
| 3,873,407 | A | 3/1975 | Kumata et al. | |
| 3,921,891 | A * | 11/1975 | Gorham | B65D 5/48034 229/120.26 |
| 4,127,304 | A | 11/1978 | Gardner | |
| 4,224,376 | A | 9/1980 | Ishige et al. | |
| 4,375,263 | A * | 3/1983 | Dworkin | B42F 17/08 206/425 |
| 4,635,418 | A | 1/1987 | Hobgood | |
| 4,898,640 | A | 2/1990 | O'Connor | |
| 5,227,108 | A | 7/1993 | Reid, Jr. et al. | |

(Continued)

FOREIGN PATENT DOCUMENTS

JP    404065235 A    3/1992

*Primary Examiner* — Hemant M Desai
*Assistant Examiner* — Mobeen Ahmed
(74) *Attorney, Agent, or Firm* — Wood, Herron & Evans, LLP

(57) ABSTRACT

A partition assembly comprising a partition matrix made up of intersecting first and second slotted partitions, each of the partitions having at least one slot and a rounded edge. The slots of the partitions are engaged with each other at a plurality of intersections. The partitions are made by rounding an edge of a multi-layered blank using a rotatable tool and then cutting the partition material to a desired size. Slots may then be formed in the edge sealed material.

35 Claims, 15 Drawing Sheets

(56) References Cited

U.S. PATENT DOCUMENTS

| | | | |
|---|---|---|---|
| 5,356,004 A | 10/1994 | Weinreb | |
| 5,501,361 A | 3/1996 | DeMordaunt | |
| 5,732,876 A | 3/1998 | Bradford | |
| 5,788,146 A | 8/1998 | Bradford et al. | |
| 5,826,746 A | 10/1998 | Ash, Jr. | |
| 5,876,813 A | 3/1999 | Bambara et al. | |
| 5,882,776 A | 3/1999 | Bambara et al. | |
| 5,938,878 A * | 8/1999 | Hurley | A43B 5/08 156/209 |
| 6,054,005 A | 4/2000 | Hurley et al. | |
| 6,167,790 B1 | 1/2001 | Bambara et al. | |
| 6,375,779 B1 | 4/2002 | Melquist et al. | |
| 6,416,854 B2 | 7/2002 | Hunter, Jr. | |
| 6,561,240 B2 * | 5/2003 | Ma | A45C 13/02 150/104 |
| RE38,707 E | 3/2005 | Merkel | |
| 7,235,200 B2 | 6/2007 | Dry et al. | |
| 7,344,043 B2 | 3/2008 | Nyeboer | |
| 7,344,044 B2 | 3/2008 | Bradford et al. | |
| 7,565,856 B2 | 7/2009 | Pfaff, Jr. | |
| 7,878,362 B2 | 2/2011 | Nyeboer | |
| 8,061,549 B2 | 11/2011 | Nyeboer et al. | |
| 8,079,490 B2 | 12/2011 | Nyeboer et al. | |
| 8,100,283 B2 | 1/2012 | Nyeboer et al. | |
| 8,360,306 B2 * | 1/2013 | Vroon | B65D 25/04 229/120.07 |
| 8,562,884 B2 | 10/2013 | Vroon | |
| 2004/0096626 A1 * | 5/2004 | Azevedo | B32B 3/18 428/136 |
| 2004/0118854 A1 * | 6/2004 | Kutun | B65D 5/326 220/507 |
| 2006/0157489 A1 * | 7/2006 | Bradford | B29C 66/542 220/552 |
| 2008/0017309 A1 * | 1/2008 | Bradford | B29C 53/36 156/308.2 |
| 2008/0105687 A1 * | 5/2008 | Nyeboer | B31B 11/00 220/552 |

* cited by examiner

PARTITION ASSEMBLY MADE WITH PARTITIONS HAVING ROUNDED EDGES, STIFFENING MEMBERS AND METHOD OF MAKING SAME

CROSS-REFERENCE TO RELATED APPLICATIONS

This application is a continuation of U.S. patent application Ser. No. 13/714,677 filed Dec. 14, 2012 entitled "Partition Assembly Made With Partitions Having Rounded Edges and Method of Making Same", which is fully incorporated by reference herein. U.S. patent application Ser. No. 13/714,677 is a continuation of U.S. patent application Ser. No. 12/575,108 filed Oct. 7, 2009 entitled "Partition Assembly Made With Partitions Having Rounded Edges and Method of Making Same", now U.S. Pat. No. 8,360,306, which is fully incorporated by reference herein.

FIELD OF THE INVENTION

The present invention relates to a partition assembly for dividing the space inside a container or box; more particularly, to a partition assembly made of slotted partitions having rounded edges.

DESCRIPTION OF THE PRIOR ART

In the storage, shipment or display of parts or merchandise, it is a common practice to divide the interior of a box or container into a plurality of individual cells. The interior of a box or container is typically separated by a series of dividers, one set of parallel dividers being orthogonal to a second set of dividers. The dividers separate the interior of the container into a plurality of individual holding cells, each of which is intended to hold a separate item for display and/or shipment. The division of the interior of the box or container helps prevent the items therein from contacting one another and breaking during shipping. The division or partitioning of the container also aids in the loading and unloading of the items therein, as well as inventorying the contents of each box or container.

The dividers typically are slotted and arranged in an orthogonal relationship to divide the interior of the box or container into a desired number of holding cells. The dividers are slotted in a manner that enables the dividers to engage with one another at the location of the slots so that the dividers form an orthogonal grid or matrix. Typically, the dividers are made of the same material as the material of the box or container, plastic or paperboard. However, the dividers may be constructed of any suitable material with sufficient rigidity to prevent the contents of the container from contacting one another and being damaged.

One disadvantage with known partition assemblies is that the upper edges of the partitions may have exposed sharp edges. For example, corrugated plastic partitions may have sharp upper edges created by cutting a sheet of corrugated plastic to the desired partition size. Such an exposed upper edge of the partition may damage products or parts being loaded into or unloaded from the cells of the container in which is located the partition matrix or assembly. Partition assemblies incorporating partitions having exposed sharp upper edges may require additional clearance between the parts being either loaded or unloaded and the upper edges of the partitions.

Another disadvantage of such partition assemblies is that the person loading or unloading parts or products into or from the cells of the container may cut or scrape their knuckles or hands on the exposed upper edges of the partitions when loading or unloading parts or products.

Additionally, the stiffness of the partitions of the assembly is dictated by the material from which the partitions are made. The stiffness of the partitions may not be altered without changing the material from which the partition is made.

U.S. Pat. No. 2,647,679 discloses a partition assembly which separates the interior of a box or container into a plurality of cells. The partitions of the assembly disclosed in this patent are formed by folding a blank of material along a fold line so as to create a rounded smooth upper edge. The material is disclosed as being paperboard or similar material.

Another partition assembly for dividing the interior of a container is disclosed in U.S. Pat. No. 4,375,263. The partitions of this assembly are similarly rounded along their upper edges and are made of transparent vinyl sheets.

In each of these prior art partition assemblies, the opposed plies of the dividers or partitions formed by folding a blank of material are not secured to each other. Consequently, the opposed sides or plies of the partitions are not secured to each other and may be easily separated, thereby expanding into the cells of the container defined by the partition assembly. Consequently, the partitions may contact the products or parts stored in the cells and damage them. Additionally, the partition plies may easily tear or otherwise be damaged. Upon assembly or disassembly of the partition matrix, one or more portions of the partitions may tear and hence cause disassembly of at least a portion of the partition matrix.

It therefore has been one objective of the present invention to provide a partition having a rounded edge for use in a partition assembly, which is more likely to stay intact than heretofore know partitions.

It has been a further objective of the invention to provide a method of manufacturing a partition having a rounded edge for use in a partition assembly which is secure and may not be easily disassembled.

It has been another objective of the present invention to provide a partition having a rounded edge for use in a partition assembly in which the partition has desired properties such as stiffness.

SUMMARY OF THE INVENTION

The partition assembly which accomplishes these objectives comprises at least one first slotted partition intersecting with at least one second slotted partition at an intersection. The intersecting first and second slotted partitions form a plurality of holding cells into which different parts are stored for shipment or display.

Each first slotted partition has at least one slot extending inwardly from an edge of the first slotted partition. Likewise, each second slotted partition has at least one slot extending inwardly from an edge of the second slotted partition. Preferably, the slots are evenly spaced in order to make the holding cells which are defined by the intersecting partitions of identical dimensions. However, the slots may be located at any desired location. In one embodiment, each of the slots of a first slotted partition extends inwardly from an edge of the first slotted partition to approximately the midpoint of the first slotted partition. Each of the slots of a second slotted partition extends inwardly from an edge of the second slotted partition to approximately the midpoint of the second slotted partition.

The slotted partition may be formed of a multi-layered material or blank which is manipulated by a forming tool to create a rounded edge before or after being slotted. The slotted partition comprises an inner layer of foam or foam interior portion, preferably polyolefin foam, and two opposed outer layers or skins bonded directly or laminated to opposed faces of the inner foam layer. The inner foam layer may be made of a closed-cell polypropylene or other polypropylene and comprises a single ply or layer of foam, as opposed to a two-ply foam layer as disclosed in U.S. Pat. No. 7,344,043.

The outer layers, or skins, may be made of fabric, textile material such as, for example, woven polyester, non-woven polyester, non-woven or spun-bonded polypropylene, foamed or solid polyolefin or other material, such as latex or non-polyolefin plastic. The outer layers may be selected as appropriate to protect or prevent surface damage to the products being stored and/or shipped in the cells of the container.

In an alternative embodiment, a desired stiffness or rigidity may be created in the partition by inserting into the partition blank, from which the partition is made, a thin plastic skin or middle layer between the inner foam layer and the outer layers or skins. By altering the thickness and/or mechanical properties of the partition blank, the desired level or degree of stiffness of the partition may be achieved during the manufacturing process.

The method of manufacturing the partition comprises multiple steps. Although the method is described with respect to one embodiment, the method may be used with any of the embodiments contemplated by this invention.

In one instance, the method of forming a slotted partition comprises a first step of providing a multiple layered partition blank comprising a foam substrate having opposed first and second surfaces or faces and a first fabric outer layer or skin secured or bonded directly to the first surface of the foam substrate and a second fabric outer layer or skin secured or bonded directly to the second surface of the foam substrate. The outer skins or layers, alternatively, may be made of material other than fabric material. This partition blank may be made using any desired known method such as co-extrusion, lamination, etc. At this stage, the partition blank has two opposed "hard" or unrounded edges which may be considered upper and lower edges.

A portion of the foam substrate of the multiple layered partition blank is heated with a heat source. According to one aspect of the invention, the heat source is placed in such proximity to an edge of the partition so that heat from the heat source causes the foam substrate to become at least partially molten and shrink or collapse. The upper edges of the first and second outer layers are then brought together over an upper edge of the foam substrate to create a rounded edge using a forming tool. The heat source is then distanced from the partition and the partition allowed to cool, thereby creating a securement of the foam substrate to the outer skins of the partition to create a unitary partition having a foam interior portion surrounded by outer skins and having a rounded edge. The heat source may be hot air or any other suitable heat source. The partition may then be slotted in desired locations.

Another aspect of the present invention comprises a method of forming a partition assembly for use in a container, the method comprising the steps of: first providing a first slotted partition comprising a foam substrate and opposed outer skins of a fabric material secured to opposed faces of the foam substrate wherein the first slotted partition has a rounded upper edge. The next step comprises providing a second slotted partition comprising a foam substrate and opposed outer skins of a fabric material secured to opposed faces of the foam substrate wherein the second slotted partition has a rounded upper edge. The next step comprises engaging the slots of the first and second partitions to form a partition assembly.

One advantage of using a multilayered partition blank having a foam interior made of a polyolefin foam is that upon the application of heat, the two outer skins of the partition blank may be moved together, thereby creating a rounded edge. The partition having a rounded edge may then be cooled and slotted. The creation of slotted partitions having rounded edges using only heat and no other materials may not be possible or economically desirable with other materials such as paperboard, commonly used to make partitions.

Such a process of creating a user friendly partition assembly having the desired stiffness without the use of any additional material other than the material of the individual partitions is quick, economical and allows many partitions having rounded edges to be mass produced with low material and labor costs.

This method of making a slotted partition by rounding one edge of the partition is quick, easy and inexpensive. The opposed layers of the partition are permanently secured to each other, making the partition non-disassembling and enhanced without using any additional material or tools.

BRIEF DESCRIPTION OF THE DRAWINGS

FIG. 3A is a side elevational view of a partition blank used in accordance with the present invention;

FIG. 3B is a side elevational view of the partition blank of FIG. 3A with heat being applied;

FIG. 3C is a side elevational view of the partition blank of FIG. 3B showing a rounding tool above the partition;

FIG. 3D is a side elevational view of the partition blank of FIG. 3B showing the rounding tool of FIG. 3C being moved along an edge of the partition blank;

FIG. 3E is a cross-sectional view taken along the line 3E-3E of FIG. 2;

FIG. 3F is a perspective view illustrating a method of cutting the partition to size;

FIG. 3G is a perspective view illustrating a finished slotted partition according to one embodiment of the present invention;

DETAILED DESCRIPTION OF THE PREFERRED EMBODIMENT

Figure 1:
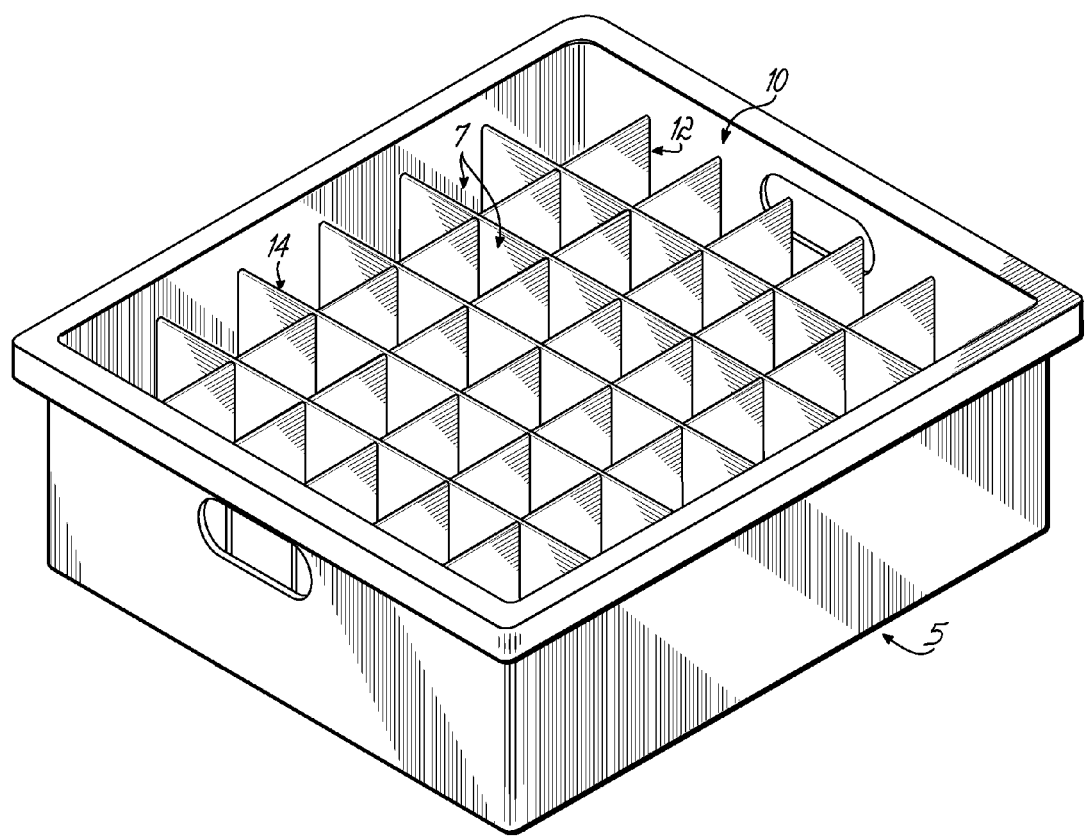
FIG. 1 is a perspective view of the partition assembly of the present invention located inside a container.
Figure 2:
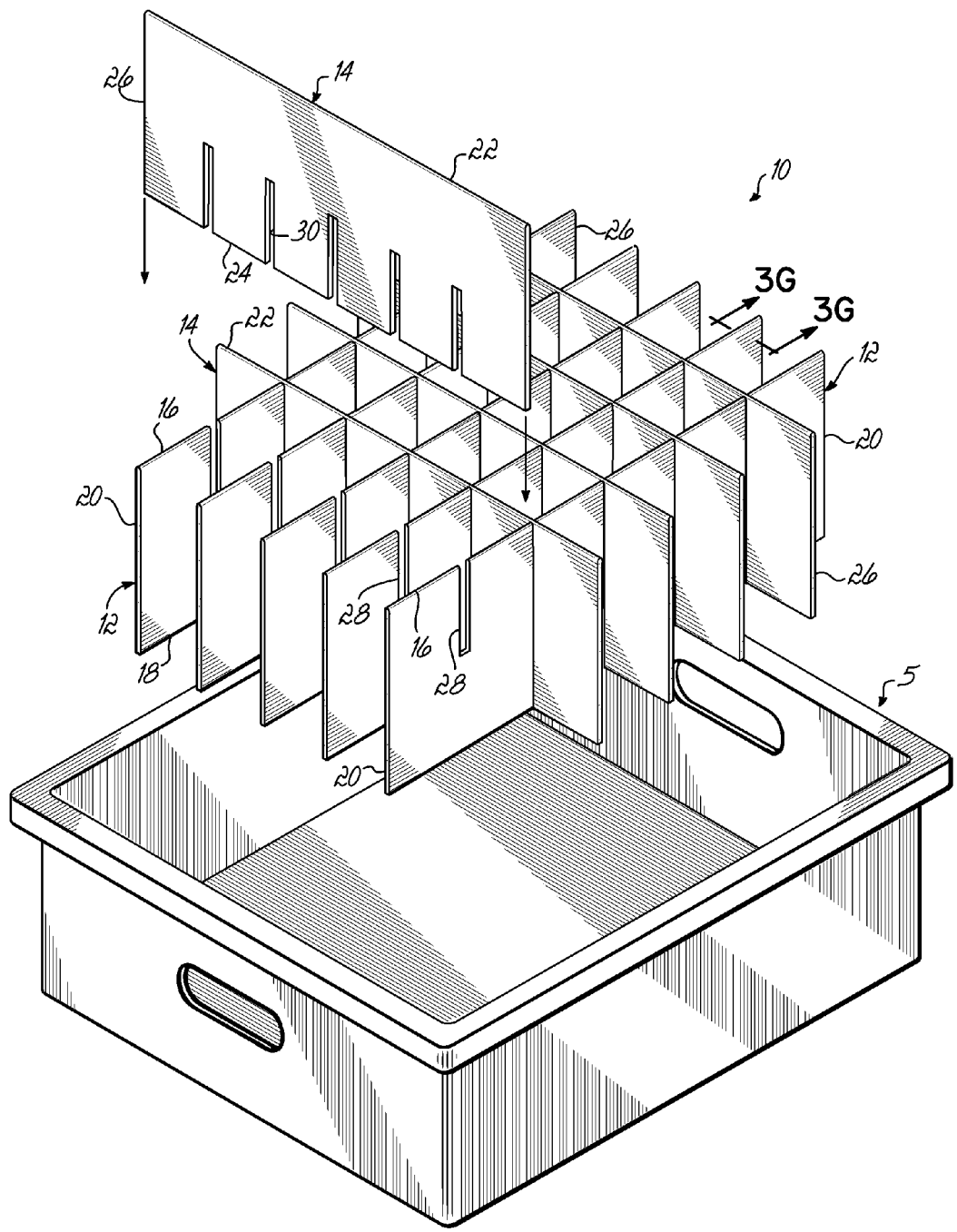
FIG. 2 is a perspective view of the construction of the partition assembly of FIG. 1 illustrating a plurality of first slotted partitions and a plurality of second slotted partitions.

Referring to the drawings, and particularly to FIG. 1, there is illustrated a partition assembly 10 for dividing the space inside a container 5. Although one type or configuration of container 5 is illustrated in FIG. 1, the partition assembly 10 of the present invention may be used in any type of container or box. As illustrated in FIG. 2, the partition assembly 10 comprises a plurality of parallel first slotted partitions 12 intersecting with a plurality of parallel second slotted partitions 14.

As shown in FIG. 2, each first slotted partition 12 has a rounded upper or top edge 16, a planar bottom edge 18 and two opposed side edges 20. Likewise, each second slotted partition 14 has a rounded upper or top edge 22, a planar bottom edge 24 and two opposed side edges 26.

Each first slotted partition 12 has at least one slot 28 which extends downwardly from the top edge 16 of the first slotted partition 12 to approximately the midpoint of the first slotted partition 12. The slots 28 may be evenly spaced apart in order that the individual holding cells 7 of the partition assembly may be evenly sized. See FIG. 1. Alternatively, the slots 28 of the first slotted partitions 12 may be unevenly spaced in order to form holding cells of the partition assembly of differing sizes to accept different sized parts. The slots 28 are shown as being vertical, but may be horizontal if the partition assembly 10 is placed on edge.

As shown in FIG. 2, each second slotted partition 14 has at least one slot 30 extending upwardly from the bottom edge 24 of the second slotted partition 14 to approximately the midpoint of the second slotted partition 14. The slots 30 of the second slotted partitions 14 may also be evenly spaced in order so that the holding cells 7 of the partition assembly 10 may be evenly sized. Again, see FIG. 1. Alternatively, the slots 30 may be unevenly spaced in order to form holding cells of the partition assembly of differing sizes adapted to accept different sized parts. The slots 30 are shown as being vertical, but may be horizontal if the partition assembly 10 is placed on edge.

Figure 3A:
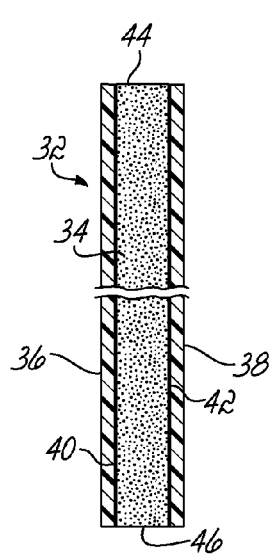
FIGS. 3A-3G illustrate one method of manufacturing a slotted partition in accordance with the present invention.

In one embodiment of the present invention, each of the first and second slotted partitions 12, 14 is made by the method shown in FIGS. 3A-3G and described below. FIG. 3A illustrates a multi-layered partition blank 32 in detail according to one embodiment of the present invention. The partition blank 32 may be any desired size, i.e., any desired height, length or width. As best illustrated in FIG. 3A, multi-layered partition blank 32 has three layers: a middle foam substrate or layer 34 and two fabric layers or skins 36, 38 located on opposite sides of the middle foam substrate 34. All three layers of the multi-layered partition blank 32 are parallel to one another and joined together. The middle foam substrate 34 has opposed first and second side surfaces or faces 40, 42, respectively. The first fabric layer 36 is bonded directly, laminated or secured in any desired manner to the first side surface 40 of the middle foam substrate 34. Likewise, the second fabric layer 38 is bonded directly, laminated or secured in any desired manner to the second side surface 42 of the middle foam substrate 34. The multi-layered partition blank 32 has a generally planar upper edge 44 and a generally planar lower edge 46 parallel one another and orthogonal to the three layers of the multi-layered partition blank 32, as shown in FIG. 3A.

A wide variety of materials may be used for the middle, single layer foam substrate 34 of the multi-layered partition blank 32 including, but not limited to, polyolefin foam, such as polypropylene. In one embodiment, the foam substrate 34 comprises a closed cell polypropylene.

A wide variety of materials may be used for the outer layers or skins 36, 38 of the multi-layered partition blank 32 including, but not limited to, woven polyesters, non-woven polypropylenes, foamed and solid polyolefins, latex, non-polyolefin plastics.

Figure 3B:
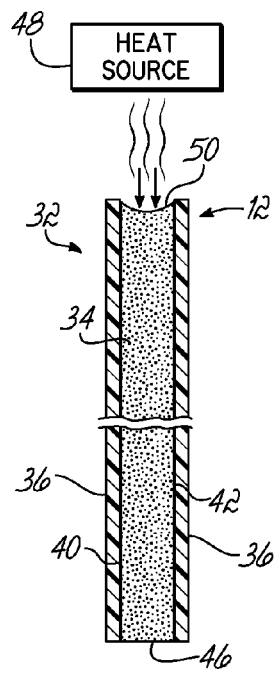

Referring to FIG. 3B, to practice the method of this invention and form a multi-layered slotted partition 12 or 14 having a rounded edge for subsequent use in a slotted partition assembly 10 as shown in FIGS. 1 and 2, multi-layered partition blank 32 shown in FIG. 3A is subjected to heat from a heat source 48. As illustrated in FIG. 3B, an upper edge of the multi-layered partition blank 32 is passed underneath heat source 48, which may be an infrared light, hot air or a heated wire, for example. Other heat sources may be used, if desired. Heat from the heat source 48 partially melts the middle foam substrate or foam interior portion 34 of the multi-layered partition blank 32, thereby creating a depressed area 50, as shown in FIG. 3B.

Figure 3C:
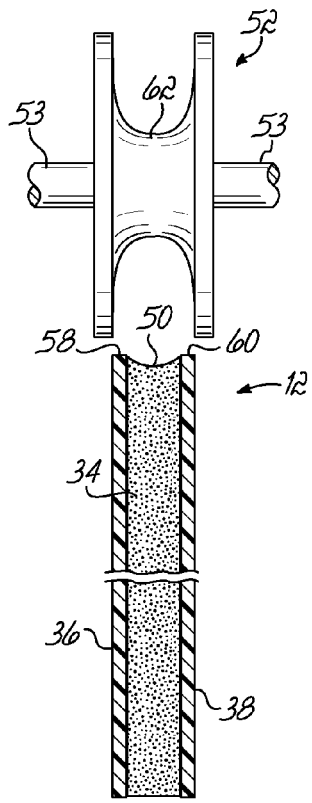
Figure 3D:
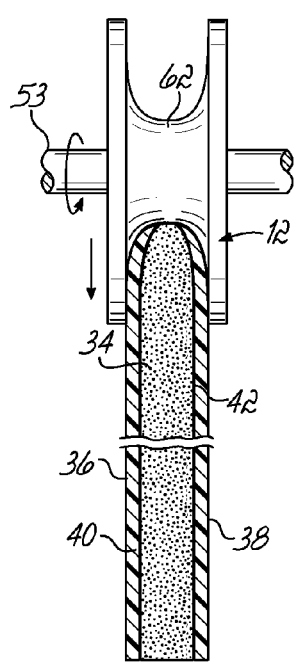
Figure 3E:
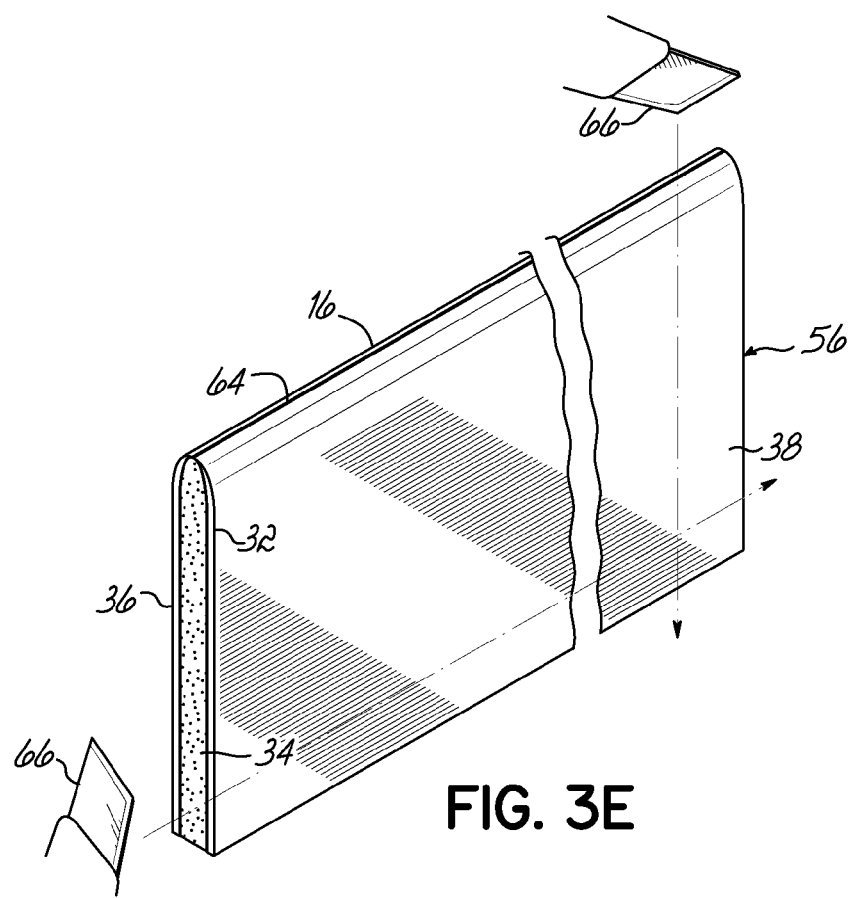

This depressed area 50 enables the first and second skins or outer layers 36, 38 to be manipulated by a rotatable shaping tool or wheel 52 to create a rounded edge 16 along the upper surface of the unslotted partition 56 shown in FIG. 3E.

FIG. 3C illustrates the rotatable shaping tool or wheel 52 driven by an axle 53 above the heated partition blank 32. Although one configuration of rotatable shaping tool or wheel 52 is illustrated, other configurations of the rotatable tool 52 are within the scope of the present invention.

FIG. 3D illustrates either the rotatable shaping tool or wheel 52 being lowered or the heated partition blank 32 being raised to engage an arcuate or curved interior shaping surface 62 of the rotatable shaping tool or wheel 52 and the upper edge of the heated partition blank 32. In other words, the upper edges 58, 60 of the outer layers or skins 36, 38 are contacted by the arcuate or curved interior shaping surface 62 of the rotatable shaping tool or wheel 52 and urged inwardly toward each other.

FIG. 3E illustrates the rotatable shaping tool or wheel 52 removed and the unslotted partition 56. At the upper portion of the unslotted partition 56, and the slotted partitions 12 and 14, the upper edges 58, 60 of the outer layers or skins 36, 38 may contact each other along a line of attachment 64. FIG. 3E illustrates the unslotted partition 56 resulting from the method of rounding the top of the multilayered partition blank 32 in the manner described above and illustrated in FIGS. 3A-3D. One or more knives 66 may be used to cut the unslotted partition 56 to the desired size.

Figure 3F:
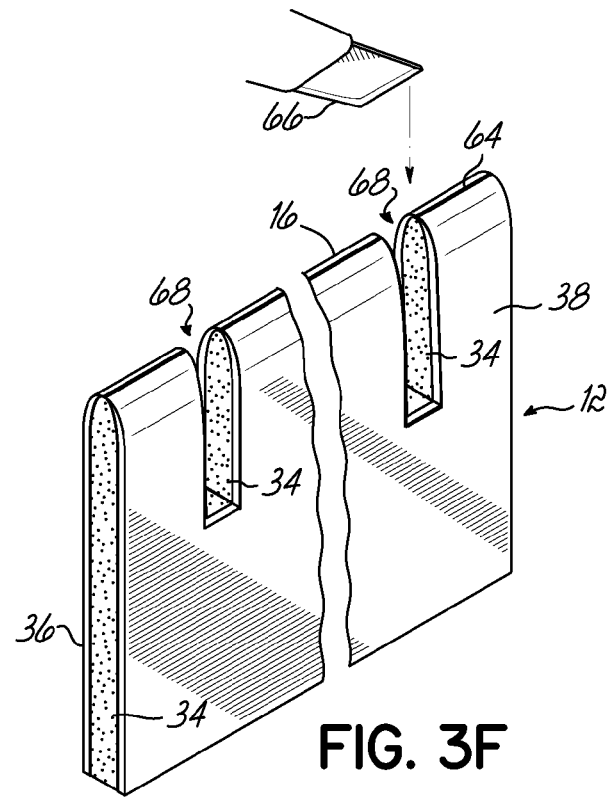

As shown in FIG. 3F, slots 68 are then cut out of the unslotted partition 56 at the desired locations. The end result is a slotted partition 12 for use in a partition assembly such as the one 10 shown in FIGS. 1 and 2. Although FIG. 3F illustrates a first slotted partition 12, the same process may be used to make a second slotted partition 14, the only difference being the location and/or direction of the slots.

Figure 3G:
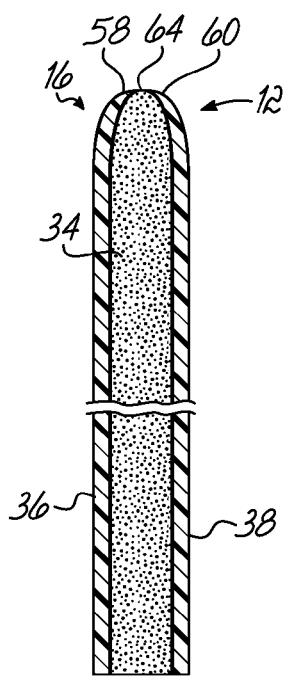

FIG. 3G illustrates a cross-sectional view of the embodiment of first slotted partition 12 for use in a partition assembly 10.

Figure 4:
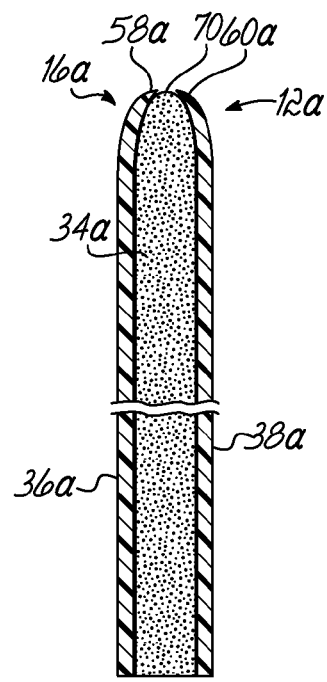
FIG. 4 is a side elevational view of another embodiment of partition like the partition shown in FIG. 3E.

FIG. 4 illustrates a cross-sectional view of an alternative embodiment of partition 12a for use in a partition assembly. In this embodiment, partition 12a is similar to the partition 12 shown in FIG. 3G, but has a gap 70 along the upper edge of the partition 12a between the upper edges 58a, 60a of the outer skins 36a, 38, respectively. In this alternative embodiment, the partition 12a has outer layers or skins 36a, 38a on opposite sides of a foam interior or substrate 34a. The partition 12a has a smooth upper edge 16a like the upper edge 16 of partition 12 shown in FIG. 3G created by using the rotatable shaping tool or wheel 52 in the manner described herein.

Figure 5:
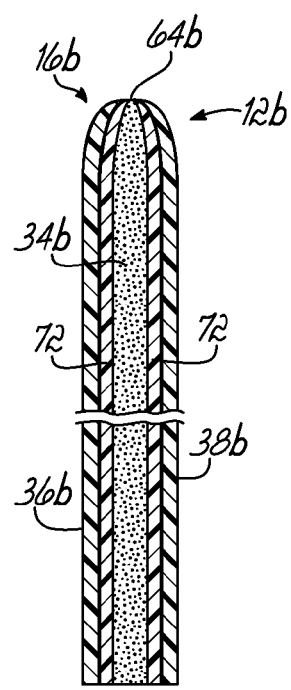
FIG. 5 is a side elevational view of another embodiment of partition like the partition shown in FIG. 3E.

FIG. 5 illustrates a cross-sectional view of an alternative embodiment of partition 12b for use in a partition assembly. In this embodiment, partition 12b has additional layers incorporated therein when compared to the partition 12 shown in FIG. 3G. In this alternative embodiment, the partition 12b has outer layers or skins 36b, 38b on opposite sides of a foam interior 34b. In addition, interior stiffening layers 72 are secured between the outer layers or skins 36b, 38b and the foam interior 34b. A wide variety of materials may be used for the middle stiffening layers or skins 72 including, but not limited to, various plastics. If desired, additional middle stiffening layers of any suitable material (not shown) may be added to the partition blank. The partition 12b has a smooth upper edge 16b including a line of attachment 64b, like partition 12 shown in FIG. 3G, created by using the rotatable shaping tool or wheel 52 in the manner described herein.

Figure 6:
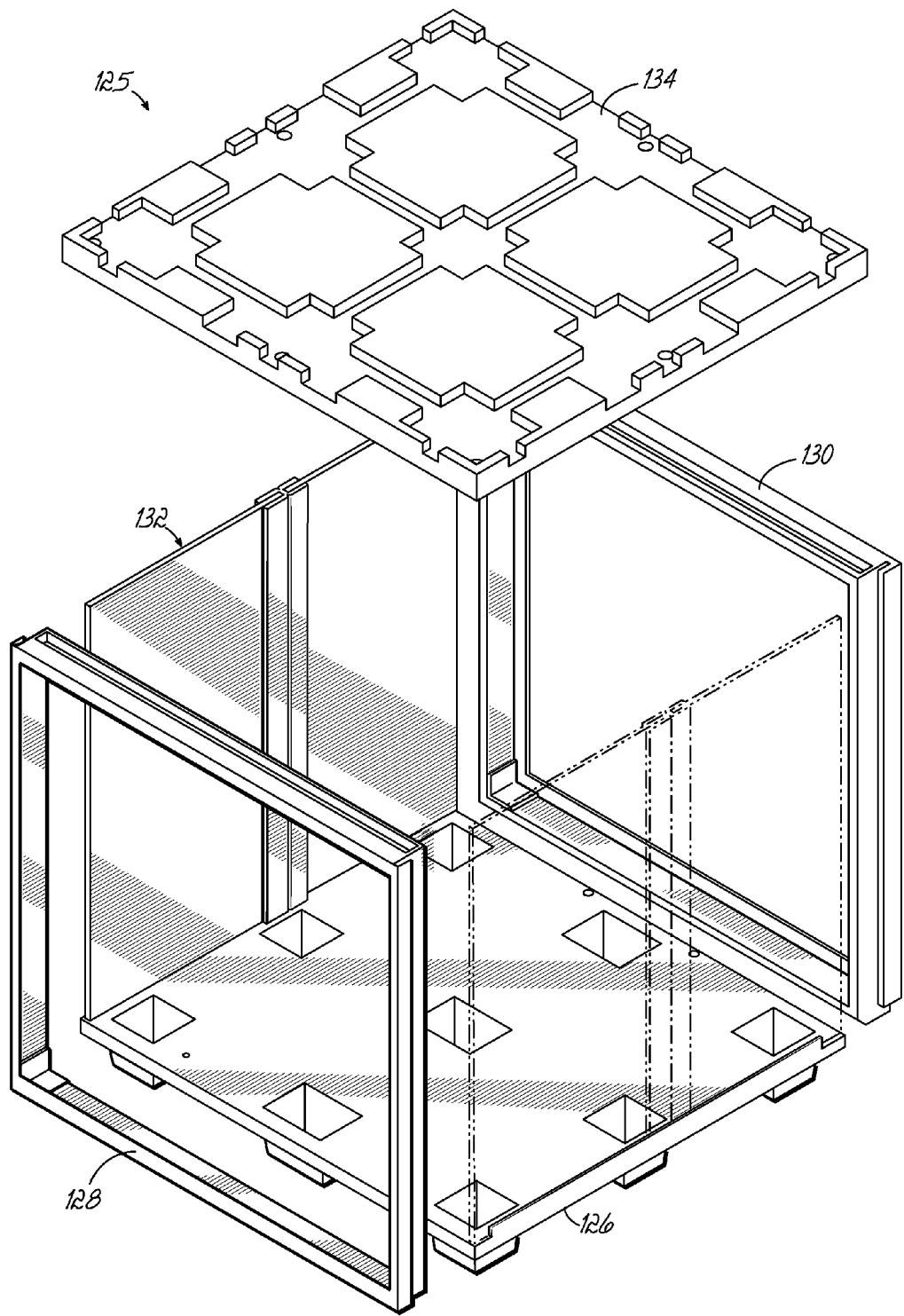
FIG. 6 is a partially disassembled perspective view of a horizontal dispensing container without a dunnage structure.

FIG. 6 illustrates a partially disassembled container 125 comprising a base 126, a front brace 128, a rear brace 130, two opposed side structures 132 and a top 134. Although one configuration of container 125 is illustrated, the dunnage structure 136 shown in FIGS. 13 and 15, or any other dunnage structure described in this document or in U.S. patent application Ser. No. 12/235,695, which is fully incorporated herein, may be used in any container including containers having only one open side or containers having four open sides.

Figure 7:
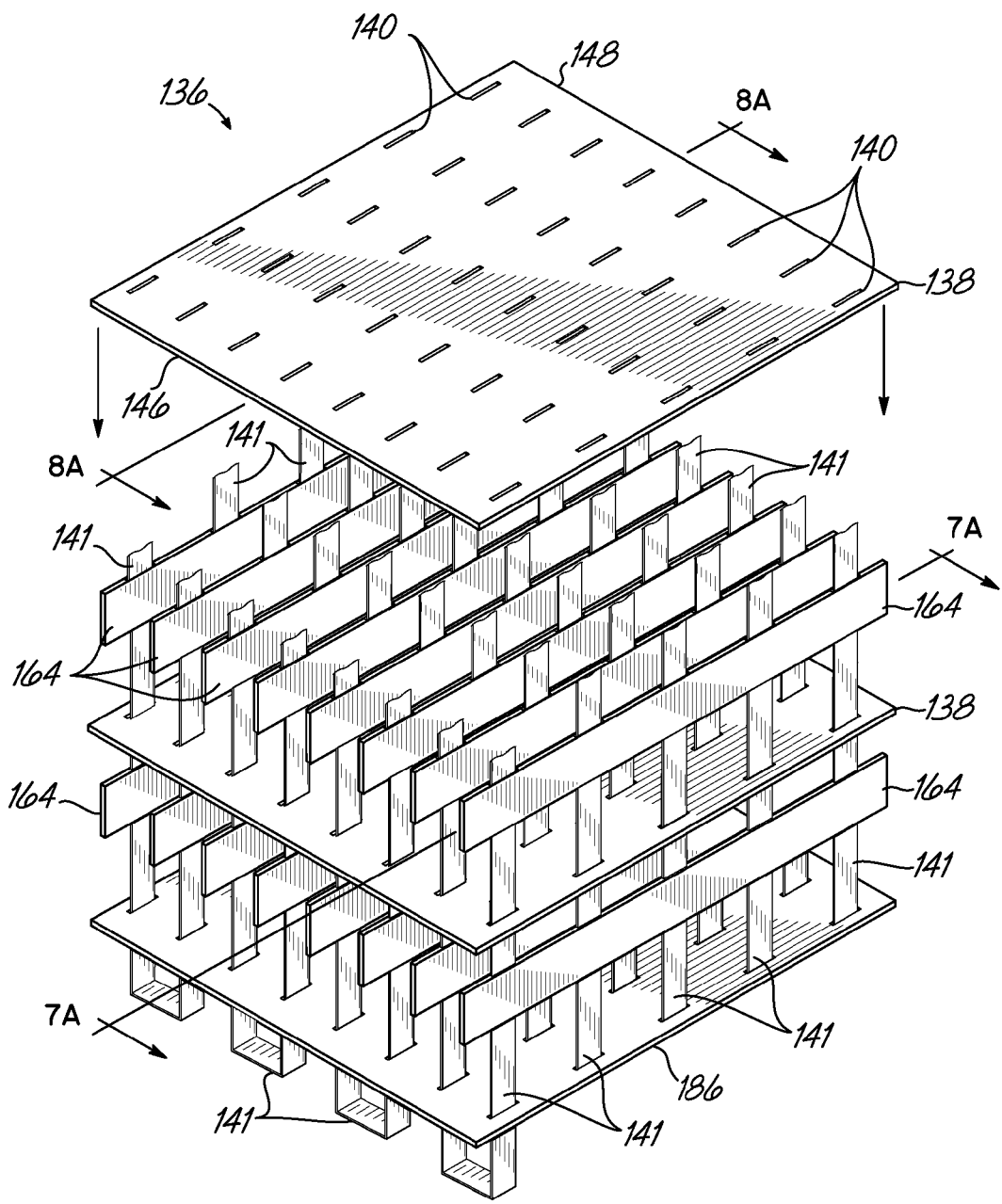
FIG. 7 is a perspective view of a dunnage structure built in accordance with one aspect of the invention in a partially disassembled condition.

FIG. 7 illustrates one embodiment of dunnage structure 136 comprising a plurality of horizontally oriented first partitions 138, each first partition 138 having a plurality of aligned slots 140 at predetermined positions and sized to allow connectors 141 to pass through the slots 140 and therefore through the partition 138. The partition 138 may be any of the partitions disclosed in U.S. patent application Ser. No. 12/235,695 and made by any of the methods described therein. Alternatively, the partition 138 may be any partition described herein and/or made in accordance with any of the methods described herein.

Figure 8A:
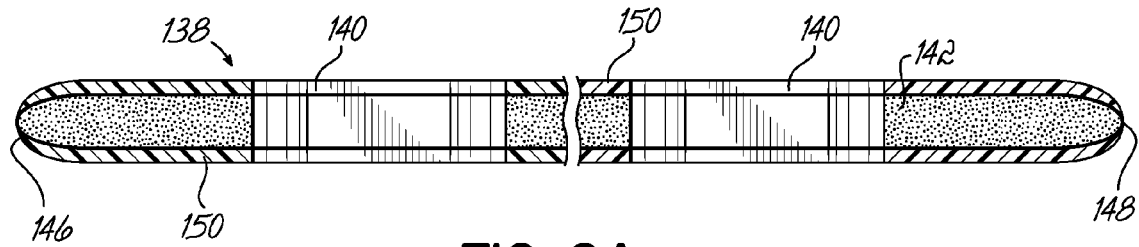
FIG. 8A is a partial cross-sectional view taken along the line 8A-8A of FIG. 7.

FIG. 8A illustrates one version of horizontally oriented first partition 138 having a middle foam substrate or layer 142 and two outer fabric layers or skins 150 located on opposite sides or faces of the middle foam substrate or layer 142. The partition 138 has a rounded front edge 146 and a rounded rear edge 148. A wide variety of materials may be used for the outer layer or skin 150 including, but not limited to, woven polyesters, non-woven polypropylenes, foamed and solid polyolefins, latex and non-polyolefin plastics. A wide variety of materials may be used for the foam interior layer 142 of the partition 138. In some embodiments, the foam interior layer 142 is a polyolefin foam. However, other materials other than foam which may be parent welded or fused together without any additional material may be used.

Figure 8B:
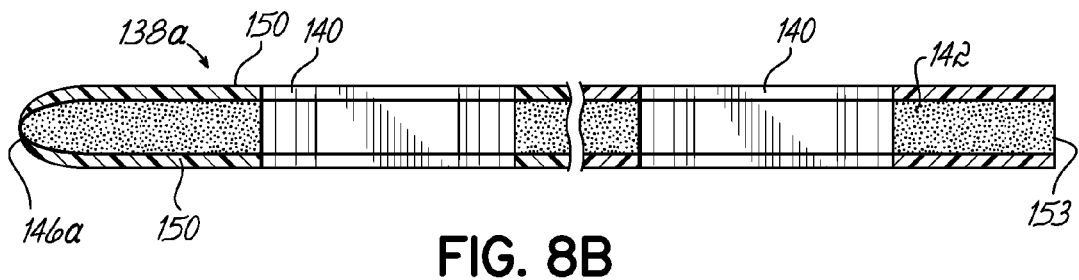
FIG. 8B is a partial cross-sectional view of an alternative horizontally oriented partition.

FIG. 8B illustrates another version of horizontally oriented first partition 138a similar to the partition 138 shown in FIG. 8A, but having only a round front edge 146a and a flat rear edge 153.

Figure 8C:
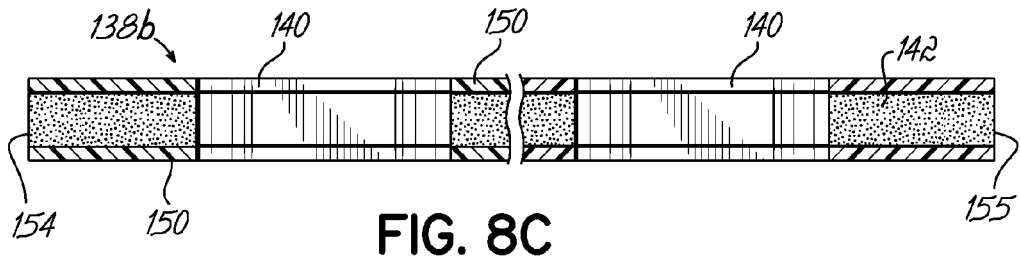
FIG. 8C is a partial cross-sectional view of an alternative horizontally oriented partition.

FIG. 8C illustrates another version of horizontally oriented first partition 138b similar to the partition 138a shown in FIG. 8B, but having a flat front edge 154, rather than a round front edge, together with a flat rear edge 155.

Figure 8D:
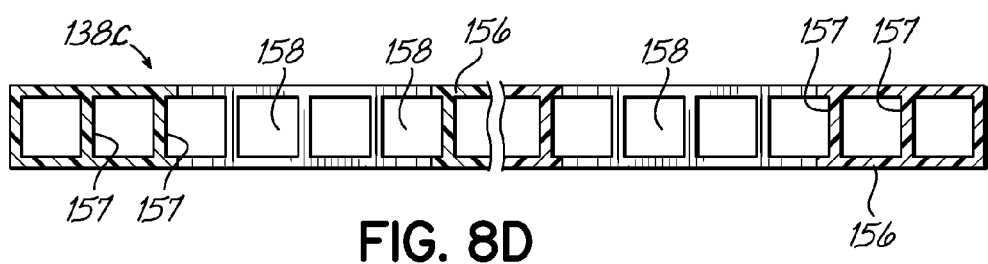
FIG. 8D is a partial cross-sectional view of an alternative horizontally oriented partition.

FIG. 8D illustrates another version of horizontally oriented first partition 138c comprising corrugated plastic. This type of first partition 138c comprises a pair of opposed face plies 156 along with a plurality of connectors 157 joining the opposed face plies 156. The opposed face plies and connectors 157 define a plurality of flutes 158.

Figure 8E:
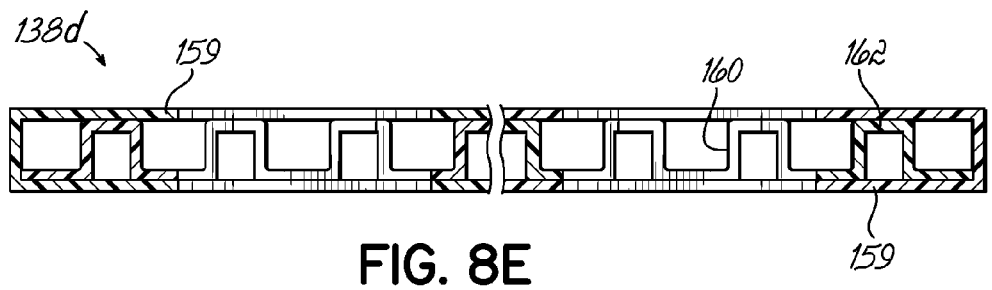
FIG. 8E is a partial cross-sectional view of an alternative horizontally oriented partition.

FIG. 8E illustrates another version of horizontally oriented first partition 138d known in the industry as Con-Pearl® sold by Friedola GmbH. This material is shown in cross-section in FIG. 8E as having opposed face plies 159 and a middle ply 160 having dimples or bumps 162.

As shown in FIG. 7, dunnage structure 136 further comprises a plurality of vertically oriented second partitions 164. Although these vertically oriented second partitions 164 are shown being the same size, they may be different sizes, i.e., different heights. These vertically oriented second partitions 164 separate adjacent horizontally oriented first partitions 138 and together with horizontally oriented first partitions 138 define a plurality of generally rectangular cells 166. See FIG. 9.

Figure 7A:
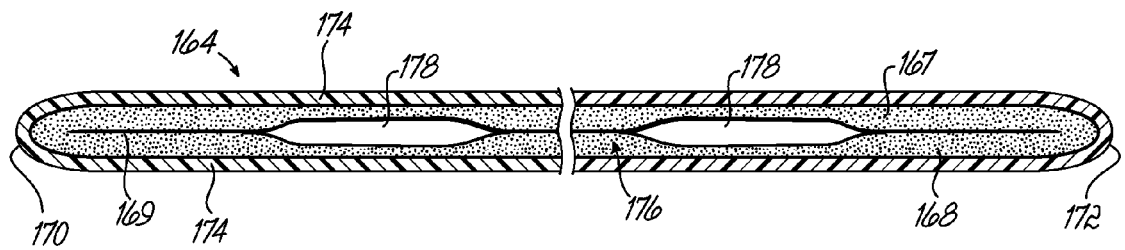
FIG. 7A is a partial cross-sectional view taken along the line 7A-7A of FIG. 7.

FIG. 7A illustrates one version of vertically oriented second partition 164 having two opposed plies 167, 168 joined along interior surface 169. The partition 164 has a rounded front edge 170 and a rounded rear edge 172. The partition 164 has an outer layer or skin 174. A wide variety of materials may be used for the outer layer or skin 174 including, but not limited to, woven polyesters, non-woven polypropylenes, foamed and solid polyolefins, latex and non-polyolefin plastics. Inside the outer layer or skin 174 is a foam interior 176 comprising the two plies 167, 168 joined together along interior surface 169. A wide variety of materials may be used for the foam interior 176 of the partition 164. In one embodiment, the foam interior 176 is a polyolefin foam. However, other materials other than foam which may be parent welded or fused together without any additional material may be used. Any of the products and/or materials described in U.S. patent application Ser. No.

12/235,695 or 12/175,983, both of which are fully incorporated herein, may be used for any of the partitions 138 or 164.

As shown in FIG. 7A, the partition 164 has a plurality of passages 178 (only two being shown). Along the length of the partition 164, the opposed plies 167, 168 are fused or parent welded to each other along contacting surfaces except where the passages 178 are located. In these locations, the opposed plies 167, 168 are separated from each other to allow connectors 141 to pass through the passages 178 in partitions 164. Although the drawings show each second partition 164 having five parallel passages 178, the partitions 164 may have any number of passages of any desired width in any desired locations.

Figure 7B:
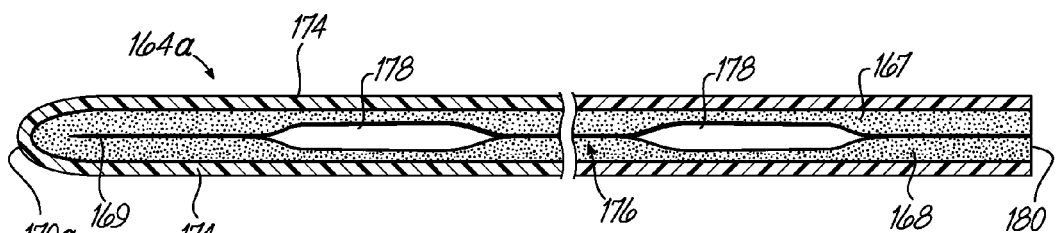
FIG. 7B is a partial cross-sectional view of an alternative vertically oriented partition.

FIG. 7B illustrates another version of vertically oriented second partition 164a similar to the partition 164 shown in FIG. 7A, but having a round front edge 170a and a flat rear edge 180.

Figure 7C:
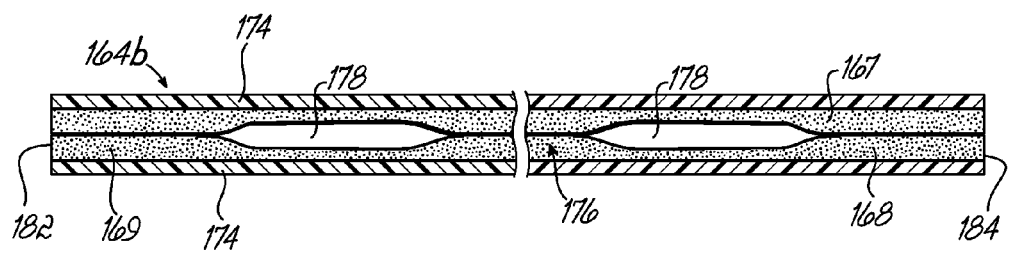
FIG. 7C is a partial cross-sectional view of an alternative vertically oriented partition.

FIG. 7C illustrates another version of vertically oriented second partition 164b similar to the partition 164a shown in FIG. 7B, but having a flat front edge 182, rather than a round front edge, together with a flat rear edge 184.

Figure 9:
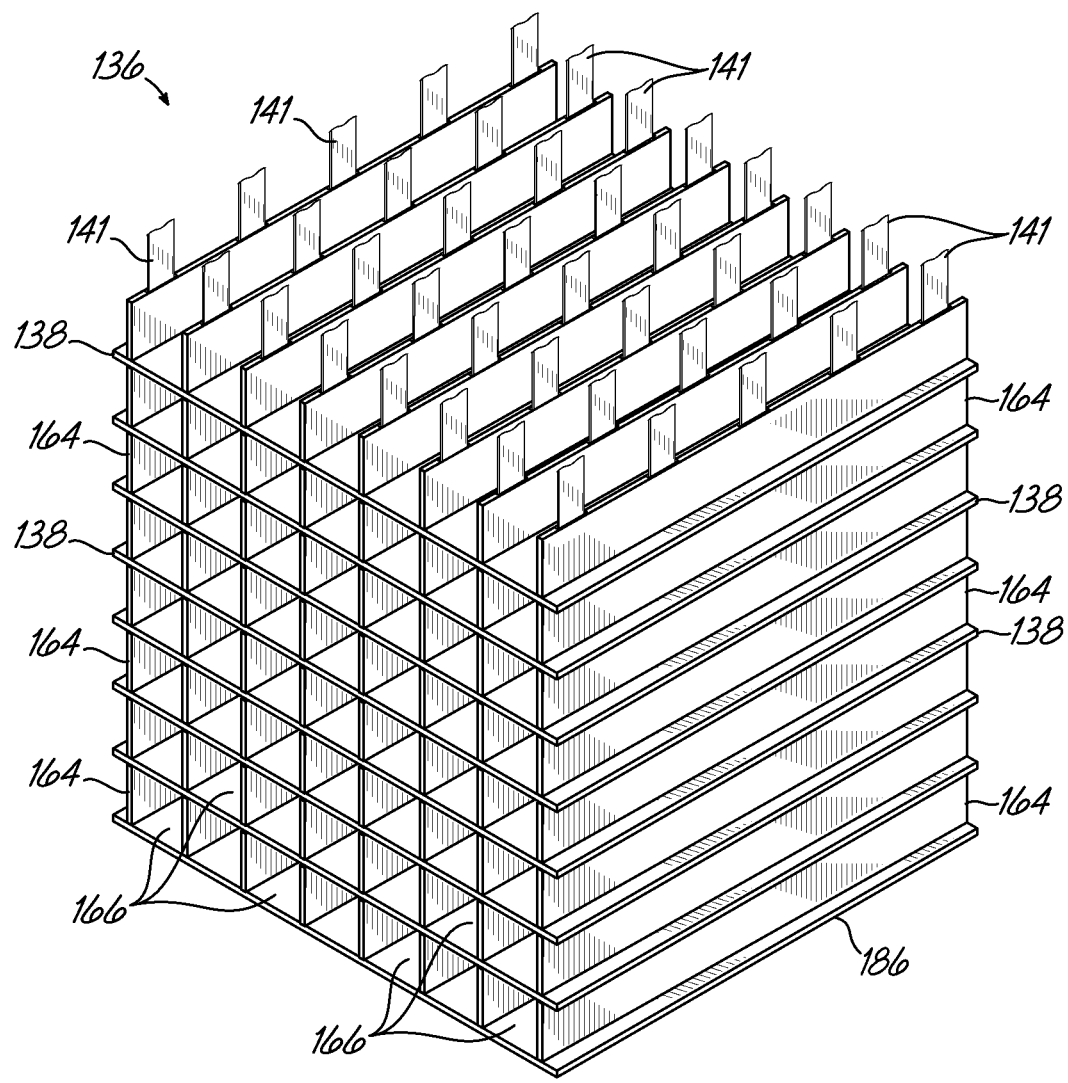
FIG. 9 is a perspective view of the dunnage structure of FIG. 7 in a partially assembled condition.

Although FIGS. 7 and 9 illustrate the dunnage structure 136 made with vertically oriented partitions 164 shown in detail in FIG. 7A, and horizontally oriented partitions 138 shown in detail in FIG. 8A, any dunnage structure described herein may be constructed using any of the partitions illustrated or described herein. For example, the dunnage structure 136 may be made with vertically oriented partitions 164a shown in detail in FIG. 7B and horizontally oriented partitions 138c shown in detail in FIG. 8D. There are many combinations possible.

FIG. 7 shows connectors 141 extending through a plurality of aligned passages 178 of aligned vertically oriented second partitions 164 and through a plurality of slots 140 in the horizontally oriented first partitions 138. As shown in FIG. 7, the bottom of a connector 141 forms a generally U-shape so the lowermost horizontally oriented first partition 138 acts as a base 186. In the illustrated embodiment, the base 186 is identical to the other horizontally oriented first partitions 138; however, it may be different for improved durability or strength. For example, it may be much thicker than the other horizontally oriented first partitions 138 or be made from a different material.

The connectors 141 in any of the embodiments may be made of plastic such as polyvinyl chloride, high density polyethylene or nylon. However, any other suitable materials, such as metal, may be used in the connectors. The connectors may be any desired shape, width or length, depending upon the application.

Figure 9A:
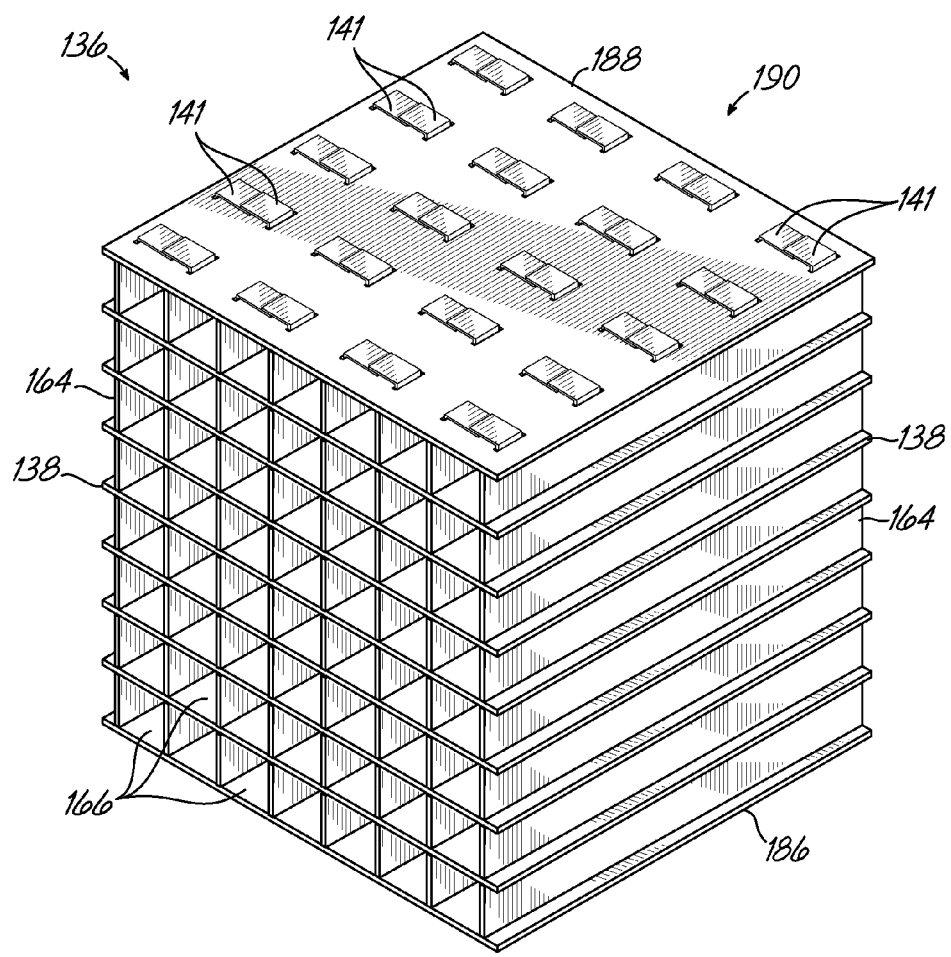
FIG. 9A is a perspective view of the dunnage structure of FIG. 9 in an assembled condition.
Figure 9B:
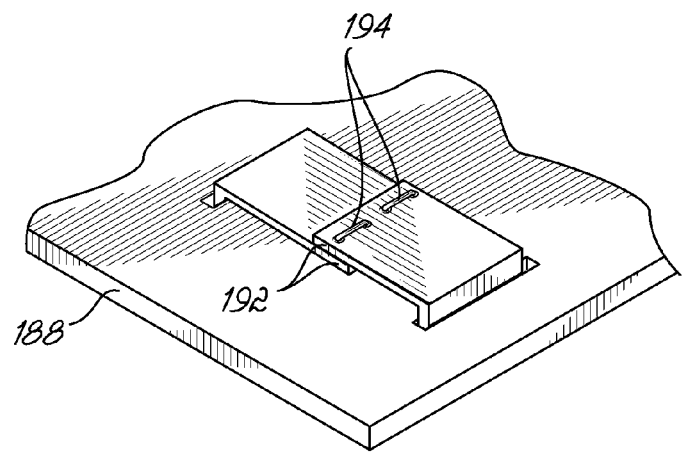
FIG. 9B is an enlarged perspective view of a portion of the dunnage structure of FIG. 9A.

FIG. 9A illustrates the dunnage structure 136 of FIGS. 7 and 9 with a top 188 to make a completed dunnage structure or assembly 190 which may be inserted and removed inside a container as desired. As shown in FIG. 9, upper portions of the connectors 141 pass through slots in the top 188 and are bent inwardly. In some applications like the one shown in FIG. 9B, overlapping portions 192 of connectors 141 above the top 188 of the completed dunnage structure 190 may be stapled with fasteners 194. Although fasteners 194 are shown as staples, any other suitable form of securing the upper portions of opposed ends of connectors 141 may be used. When completed, one piece of connector 141 may be in the form of a finished loop, securing all the dunnage components together in a neat orderly fashion.

Figure 9C:
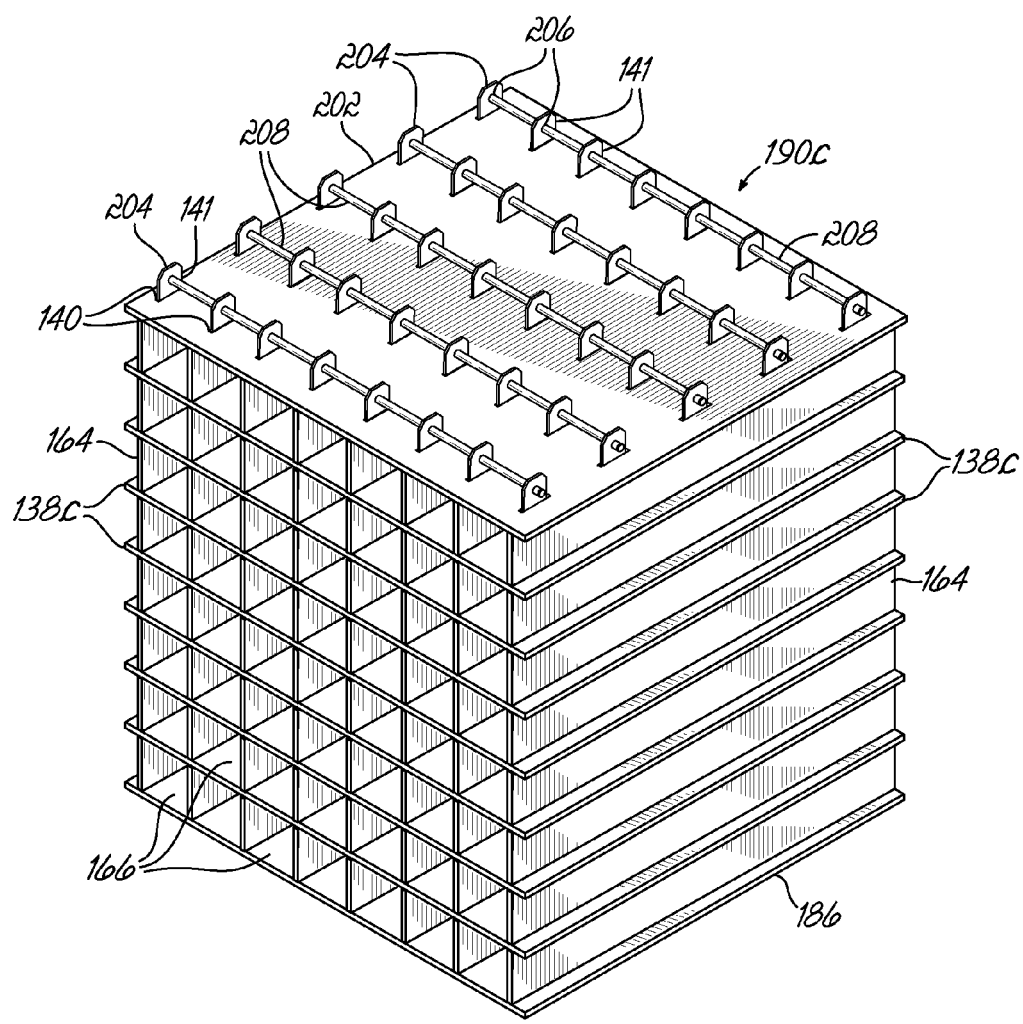
FIG. 9C is a perspective view of another dunnage structure in an assembled condition.

FIG. 9C illustrates an alternative completed dunnage structure or assembly 190c which may be inserted and removed inside a container as desired. The structure 190c has a plurality of individual holding cells 166. As shown in FIG. 9C, upper portions of the connectors 141 pass through slots 140 in an uppermost or top one 202 of a plurality of spaced horizontally oriented partitions 138c. Upper portions 204 of connectors 141 extend above the top horizontally oriented partition 202 of the completed dunnage structure 190c. These upper end portions 204 of connectors 141, respectively, each have holes 206 therein through which a locking member 208 passes. Although the locking member 208 is shown as being a bar having a circular cross-section, any other suitable locking member may be used to keep the connectors 141 from falling downwardly through the passages of the partitions 164. This method of using a locking member to pass through portions of the connectors may be used in any of the embodiments of dunnage structure contemplated by the present invention including those described or shown herein and may be used to secure the completed dunnage structure or assembly 190c inside a container, rack or similar structure used for shipping parts, such as automobile parts. For example, the locking members 208 may be longer than shown in FIG. 9C and may engage the container, rack or similar structure used for shipping parts to hold the dunnage structure inside the container or rack.

Figure 10:
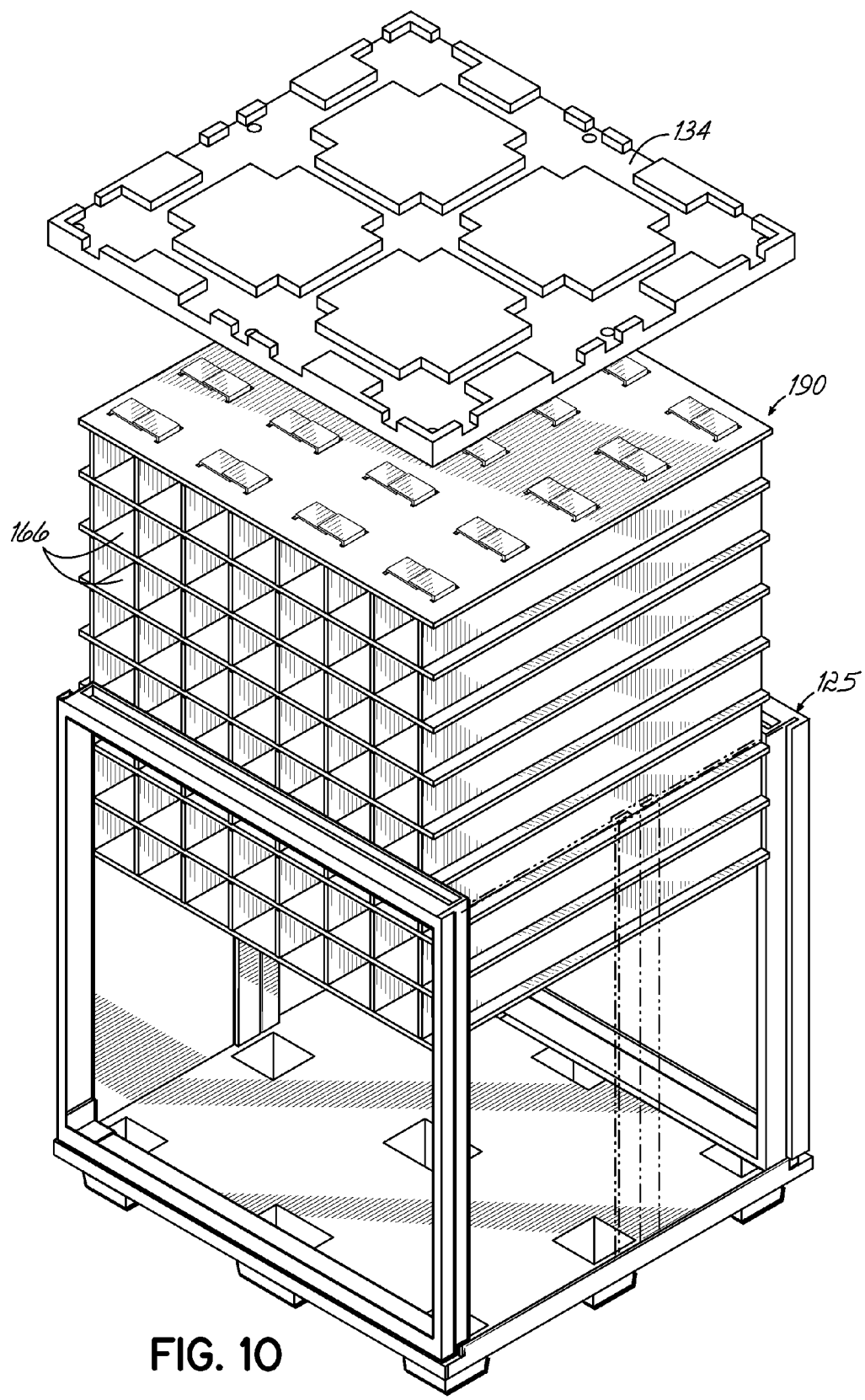
FIG. 10 is a perspective view of the dunnage structure of FIG. 9A being put inside the container of FIG. 6.
Figure 11:
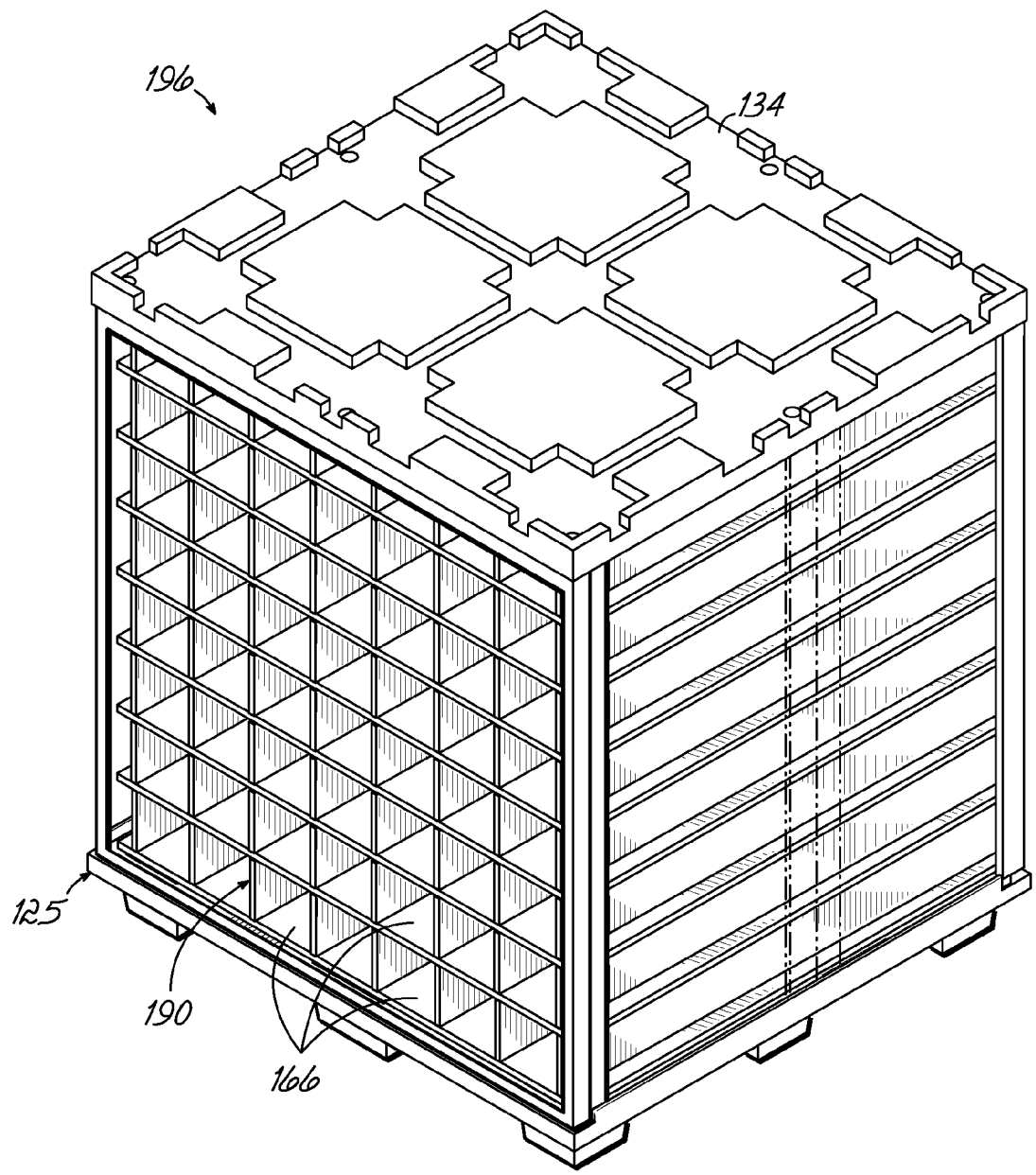
FIG. 11 is a perspective view of the dunnage structure of FIG. 15A inside the fully assembled container of FIG. 6.

FIG. 10 shows the completed dunnage assembly 190 being inserted into the container 125 prior to the container top 134 being put on the container 125. FIG. 11 shows a finished container 196 ready for use. In the finished container 196, the completed dunnage assembly 190 is located inside the container 125 and ready to be loaded or unloaded depending upon whether the cells 166 of the completed dunnage assembly 190 are empty or full, respectively.

Figure 11A:
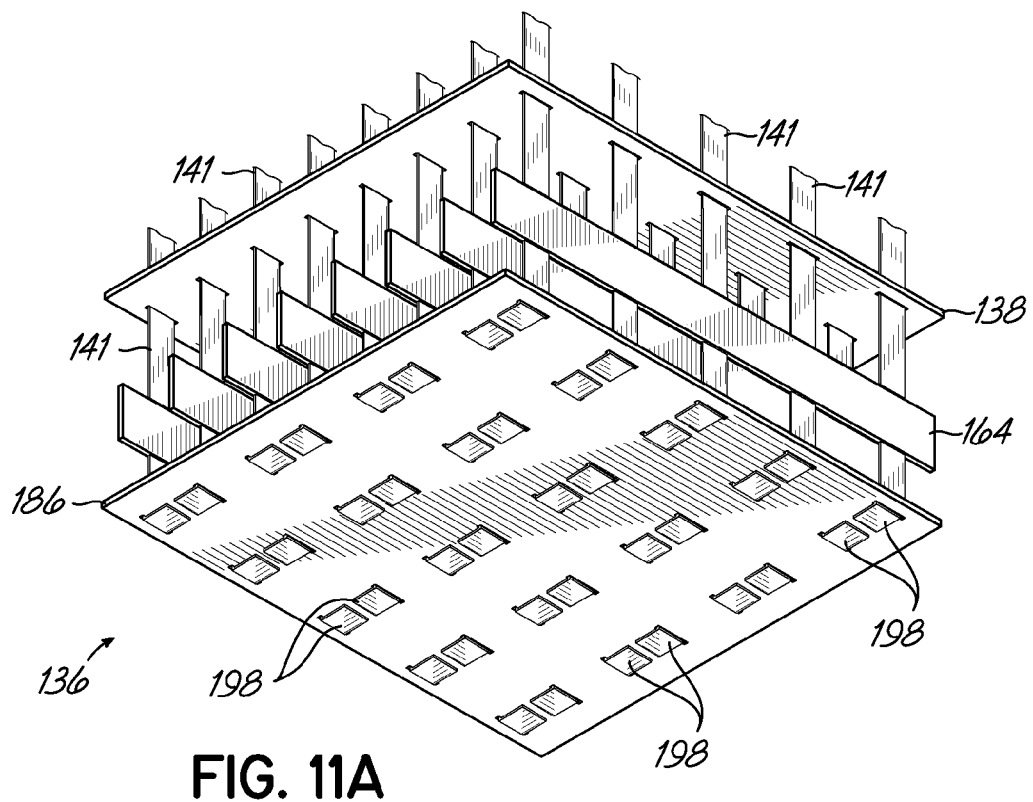
FIG. 11A is a bottom perspective view, in a partially assembled condition, of an alternative dunnage structure.
Figure 11B:
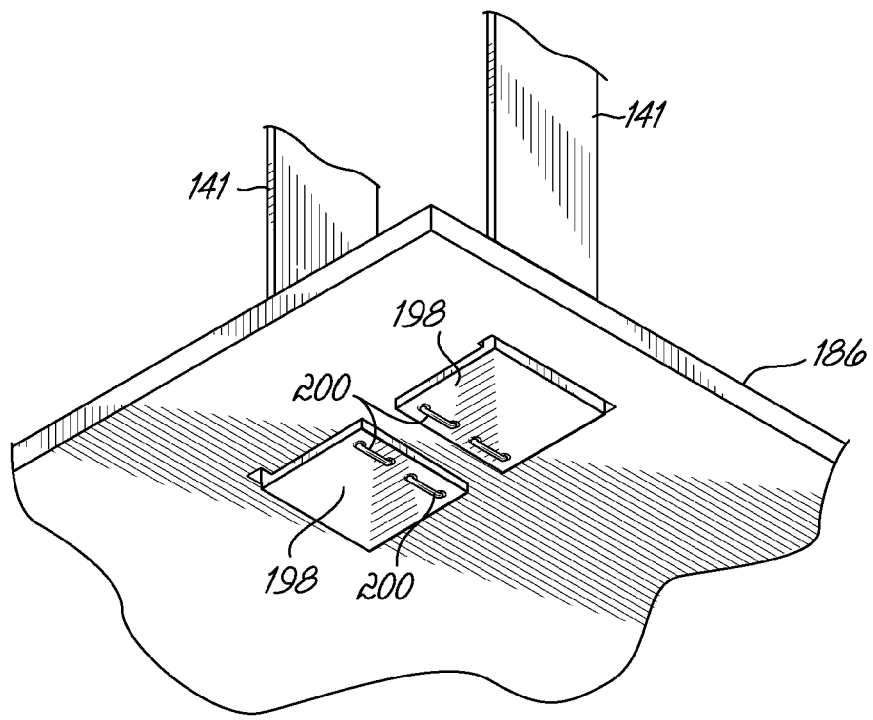
FIG. 11B is an enlarged bottom perspective view of a portion of an alternative dunnage structure.

FIG. 11A shows the underside of the dunnage structure 136. In this embodiment, the connectors 141 are not looped at the bottom below the base 186. Rather, each connector 141 passes through only one aligned group of passages 178 in partitions 164 and slots 140 in partitions 138. A lower portion 198 of the connector 141 is bent and may or may not be secured to the base 186. FIG. 11A shows these portions 198 not secured to the base 186 while FIG. 11B show these connector bottom bent portions 198 secured with fasteners 200 to the base 186.

In order to make the completed dunnage assembly 190 shown in FIG. 9A, one may build from the base 186 up. Connectors are passed through or secured to the base 186, passed through the passages 178 in the vertically oriented partitions 164, through slots 140 in the horizontally oriented first partitions 138. The ends of the connectors 141 may be fastened with fasteners, such as staples, to the base 168 or top of the completed dunnage assembly 190. The rounded edge or edges of partitions prevent scratches, cuts and abrasions when workers insert or remove parts or products from cells 166 of the completed dunnage structure 190.

While I have described only a few embodiments of my invention, I do not intend to be limited except by the scope of the following claims.

What is claimed is:
1. A method of making a slotted partition comprising:
providing a multiple layered partition blank comprising a foam substrate having opposed first and second surfaces, a first stiffening layer secured to the first surface of the foam substrate and a second stiffening layer secured to the second surface of the foam substrate, the multiple layered partition blank further comprising a first and a second outer fabric layer secured to the first and second stiffening layers, respectively;

heating the foam substrate;
bringing together edges of the first and second outer fabric layers over an edge of the foam substrate to create a rounded edge of the partition; and
slotting the partition.

2. The method of claim 1 wherein said foam substrate comprises polypropylene.

3. The method of claim 1 wherein said rounded edge is created by a rotatable tool.

4. The method of claim 1 wherein said multiple layered partition blank is not folded.

5. The method of claim 1 wherein said foam substrate comprises polyolefin foam.

6. The method of claim 1 wherein said first and second outer fabric layers are made of polyester.

7. The method of claim 1 wherein said rounded edge is created by a forming tool.

8. The method of claim 1 wherein said first and second outer fabric layers are made of a non-woven textile fiber.

9. A method of making a slotted partition for use in a partition assembly, said method comprising:
providing a partition blank comprising a single ply foam substrate, stiffening layers and a pair of outer skins, each of the stiffening layers being secured to the single ply foam substrate and one of the pair of outer skins;
heating the foam substrate;
joining the outer skins over an edge of the foam substrate to create a rounded edge; and
cooling and slotting the partition blank.

10. The method of claim 9 wherein said single ply foam substrate is a closed-cell polypropylene foam.

11. The method of claim 9 wherein said pair of outer skins are polyester.

12. A method of forming a slotted partition, the method comprising the steps of:
providing a multiple layered partition blank comprising a foam substrate having opposed first and second surfaces and a first stiffening layer bonded directly to the first surface of the foam substrate and a second stiffening layer bonded directly to the second surface of the foam substrate, the multiple layered partition blank further comprising a first outer layer secured to the first stiffening layer and a second outer layer secured to the second stiffening layer;
heating the foam substrate of the partition blank;
bringing together upper edges of the first and second outer layers over an upper edge of the foam substrate to create a rounded edge; and
slotting the multiple layered partition blank.

13. The method of claim 12 wherein the foam substrate is a polyolefin.

14. The method of claim 12 wherein said foam substrate comprises polypropylene.

15. The method of claim 12 wherein said foam substrate comprises a closed-cell polypropylene.

16. The method of claim 12 wherein said foam substrate comprises a single layer of material.

17. The method of claim 12 wherein said first and second outer layers are a non-woven fabric material.

18. The method of claim 12 wherein said first and second outer layers are polyester.

19. The method of claim 12 wherein said first and second outer layers are woven polyester.

20. A method of forming a slotted partition, the method comprising the steps of:
providing a multiple layered partition blank comprising a foam substrate having opposed first and second surfaces and a first stiffening layer bonded to the first surface of the foam substrate and a second stiffening layer bonded to the second surface of the foam substrate, the multiple layered partition blank further comprising a first fabric layer secured to the first stiffening layer and a second fabric layer secured to the second stiffening layer;
heating the foam substrate;
using a forming tool to create an edge which is rounded in a transverse direction along the edge; and
slotting the multiple layered partition blank.

21. The method of claim 20 wherein said foam substrate comprises polypropylene.

22. The method of claim 20 wherein said foam substrate comprises a closed-cell polypropylene.

23. The method of claim 20 wherein said forming tool is rotatable.

24. The method of claim 20 wherein said first and second fabric layers are a non-woven fabric material.

25. The method of claim 20 wherein said first and second fabric layers are polyester.

26. The method of claim 20 wherein said first and second fabric layers are woven polyester.

27. The method of claim 9 wherein said single ply foam substrate is a polypropylene foam.

28. The method of claim 9 wherein said each of the outer skins is woven polyester.

29. The method of claim 9 wherein said rounded edge is created by a forming tool.

30. The method of claim 29 wherein said forming tool is rotatable.

31. A method of making a partition comprising:
providing a multiple layered partition blank comprising a foam substrate having opposed first and second surfaces, a first stiffening layer secured to the first surface of the foam substrate and a second stiffening layer secured to the second surface of the foam substrate, the multiple layered partition blank further comprising a first and a second outer fabric layer secured to the first and second stiffening layers, respectively;
heating the foam substrate; and
bringing together edges of the first and second outer fabric layers over an edge of the foam substrate to create a rounded edge of the partition.

32. The method of claim 31 wherein said foam substrate comprises polypropylene.

33. The method of claim 31 wherein said rounded edge is created by a rotatable tool.

34. The method of claim 31 wherein said multiple layered partition blank is not folded.

35. The method of claim 31 wherein said foam substrate comprises polyolefin foam.

* * * * *